US008477061B1

(12) United States Patent
Pedersen

(10) Patent No.: US 8,477,061 B1
(45) Date of Patent: Jul. 2, 2013

(54) METHOD AND SYSTEM FOR PREVENTING ANTI-AIRCRAFT WARFARE ENGAGEMENT WITH NEUTRAL AIRCRAFT

(75) Inventor: Richard N. Pedersen, Toms River, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 338 days.

(21) Appl. No.: 12/825,983

(22) Filed: Jun. 29, 2010

(51) Int. Cl.
*G01S 13/74* (2006.01)

(52) U.S. Cl.
USPC .................. 342/42; 342/46; 342/50

(58) Field of Classification Search
USPC ...................................... 342/42–51
See application file for complete search history.

(56) References Cited

U.S. PATENT DOCUMENTS

| 3,875,570 | A | * | 4/1975 | Litchford | 342/32 |
| 4,677,441 | A | * | 6/1987 | Hofgen et al. | 342/174 |
| 4,805,015 | A | * | 2/1989 | Copeland | 348/48 |

* cited by examiner

*Primary Examiner* — Timothy A Brainard
(74) *Attorney, Agent, or Firm* — Howard IP Law Group, PC

(57) ABSTRACT

A method and system that prevents engagement with neutral aircraft utilizes secondary surveillance radar (SSR) in conjunction with traffic alert collision avoidance systems (TCAS) conventionally found on various commercial aircraft. The system and method provide for detecting interrogating signals sent out by a TCAS system of an interrogating aircraft searching for another aircraft that may pose a threat for collision. The system and method of the invention provide for a base system generating signals responsive to the interrogation signals such that there is a decreasing time difference between the interrogating signals and the responsive signals. The decreasing time difference indicates to the interrogating aircraft that another aircraft is approaching its airspace urging the neutral aircraft to change course and avoid entering a guarded tactical airspace thus avoiding unnecessary engagement of the aircraft.

27 Claims, 2 Drawing Sheets

METHOD AND SYSTEM FOR PREVENTING ANTI-AIRCRAFT WARFARE ENGAGEMENT WITH NEUTRAL AIRCRAFT

GOVERNMENT RIGHTS

This invention was made with Government Support under Contract No. N00024-05-C-5346 awarded by the Department of the Navy. The Government has certain rights in this invention.

FIELD OF THE INVENTION

The present invention is related to preventing AAW (Anti-Aircraft Warfare) engagement with neutral aircraft by using an SSR (Secondary Surveillance Radar) system to replicate an alert from a Traffic Alert and Collision Avoidance System (TCAS).

BACKGROUND

For a warship or other tactical engagement system, any intrusion of a guarded tactical space by non-friendly aircraft is a serious threat that must be dealt with accordingly such as by using various AAW (Anti-Aircraft Warfare) engagement means.

Conversely, preventing engagements with neutral aircraft, and in particular with commercial airliners, is a significant concern, particularly in military operations. Verbal alerts provided to the aircrew have been traditionally used to alert the aircrew to avoid intrusion into a guarded tactical space and various alert mechanisms have been used to supplement the verbal warning method. The verbal alerts may be made using radio or other known signals. Current advances that utilize Secondary Surveillance Radar (SSR) and heightened awareness are methods for mitigating, but not completely eliminating, the risk of engagement with neutral aircraft. It would be desirable to employ orthogonal methods for preventing the engagement of neutral aircraft because the goal of avoiding firing upon or otherwise engaging neutral aircraft, is more likely to be achieved when multiple, orthogonal methods are used to warn a neutral aircraft to avoid entering a protected airspace.

The Traffic Alert and Collision Avoidance System (TCAS) is an aircraft collision avoidance system based on SSR transponder signals and designed to reduce the incidence of mid-air collisions between aircraft. TCAS systems monitor the airspace around an aircraft for other aircraft equipped with a corresponding active transponder, independent of air traffic control, and warn pilots of the presence of other transponder-equipped aircraft which may present a threat of mid-air collision. An overwhelming majority of commercial and other aircraft include such TCAS systems and actively use such systems to avoid mid-air collisions by generating interrogating signals and monitoring the airspace for responses to the interrogating signals. Interrogating aircraft with older TCAS systems utilize Mode C communications and newer systems utilize Mode S communications but each is useful in identifying other aircraft in the vicinity of an interrogating aircraft. TCAS systems typically include detector systems capable of detecting interrogating signals and the signals sent responsive to the interrogating signals. In this manner, the interrogating aircraft can be alerted of another aircraft that may pose a threat.

FIG. 1 shows a Prior Art technique for alerting a friendly aircraft that it is undesirably approaching airspace being protected by a warship. Warship 2 sends radio signals 4 to approaching neutral aircraft 10 when warship 2 notices approaching neutral aircraft 10 suspiciously approaching protected airspace 8. It should be understood that various methods and techniques are known to determine if an aircraft is a neutral (i.e. not friendly or hostile) aircraft. If the aircraft is, indeed an enemy or hostile aircraft, the warship may engage the hostile aircraft such as by firing upon it. In the illustrated prior art arrangement, warship 2 may have already determined the status of neutral aircraft 10 as a neutral aircraft and may wish to alert neutral aircraft 10 not to approach protected airspace 8. In the illustrated arrangement in which radio signals 4 are used to alert the aircrew of neutral aircraft 10, problems may arise. The problems include but are not limited to technical problems associated with sending or receiving radio signals 4, inattentiveness of the aircrew or language problems between the sender and recipient of radio signals 4. Any such problems might cause neutral aircraft 10 to be unresponsive to the alerts provided by warship 2 and to continue into protected airspace 8. With neutral aircraft 10 entering protected airspace 8 unresponsive to the alerts from warship 2, warship 2 may engage neutral aircraft 10 such as by firing upon it.

It would be desirable to prevent AAW and other engagements with neutral aircraft or aircraft whose status has not been determined, by supplementing or replacing the verbal alert provided to the aircrew, using technology that is convenient and available to aircraft.

SUMMARY OF THE INVENTION

To address these and other needs and in view of its purposes, the invention provides a method and system for preventing anti-aircraft warfare engagement with neutral aircraft by using a secondary surveillance radar system to replicate an alert from a TCAS system.

According to one aspect, provided is a system for preventing engagement with a neutral aircraft. The system includes a detector for detecting SSR (Secondary Surveillance Radar) interrogation signals generated by an aircraft, including detecting frequency of generation of the interrogation signals. The system also includes a transponder that responds to the detected interrogation signals by generating corresponding response signals that are detected by the interrogating aircraft. The response signals are generated such that a time difference between a first time that the aircraft sends out the interrogation signal and the second time that the aircraft receives the corresponding response signal, decreases in time. The response signals with decreasing time differences are visually displayed on the aircraft's control panel. The response signals suggest that another aircraft is in the vicinity and urge the neutral aircraft to change course, causing the neutral aircraft to avoid traveling within a protected airspace being monitored by a system capable of engaging the neutral aircraft.

According to another aspect, a method is provided. The method prevents engagement with neutral aircraft by detecting SSR (Secondary Surveillance Radar) interrogation signals generated by an aircraft, including detecting a frequency of generation of the interrogation signals. The method further provides for responding to the interrogation signals by generating corresponding response signals such that the time difference between a first time that the neutral aircraft generates the interrogation signal and a second time that the neutral aircraft receives the corresponding response signal, decreases in time.

BRIEF DESCRIPTION OF THE DRAWING

The present invention is best understood from the following detailed description when read in conjunction with the accompanying drawing. It is emphasized that, according to common practice, the various features of the drawing are not necessarily to scale. On the contrary, the dimensions of the various features may be arbitrarily expanded or reduced for clarity. Like numerals denote like features throughout the specification and drawing.

DETAILED DESCRIPTION

The following is a detailed description of aspects of the invention that advantageously find application in preventing a warship from mistakenly engaging a neutral aircraft that enters a guarded tactical airspace. The described method and system, however, may be advantageously utilized by various other base systems that wish to notify or alert aircraft or other systems that use Mode C, Mode S or other SSR systems for TCAS or other purposes.

Figure 1:
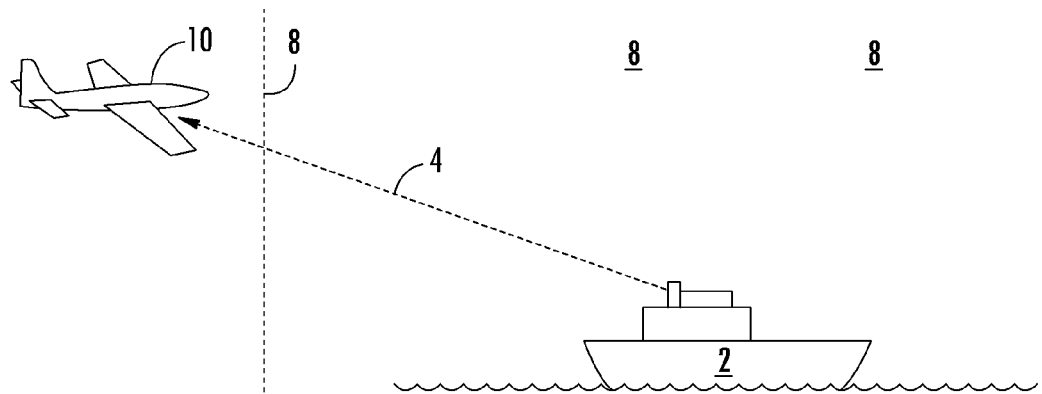
FIG. 1 is a schematic showing a warship sending a radio signal to an aircraft as a warning, according to the PRIOR ART.

As shown in the prior art arrangement of FIG. 1, there are limitations and shortcomings in conventional methods for alerting the aircrew of neutral aircraft 10 when warship 2 notices neutral aircraft 10 suspiciously approaching protected airspace 8.

Figure 2:
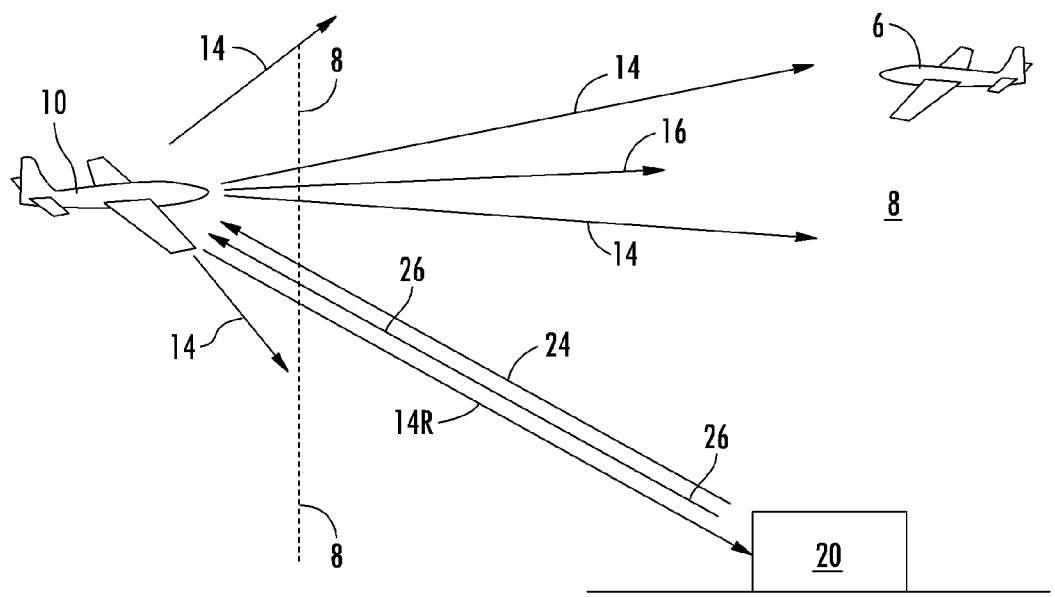
FIG. 2 is a schematic showing a warning system to prevent AAW engagement against neutral aircraft, according to an exemplary embodiment of the invention.

FIG. 2 shows an exemplary system and method according to the invention. Neutral aircraft 10 is traveling through airspace and may be approaching protected airspace 8 that is being monitored and protected by base system 20.

Base system 20 may be a warship or other active military system capable of locating aircraft or other objects and may optionally and advantageously include engagement weapons or other means such as may be used to fire upon an aircraft when an aircraft enters a guarded tactical space being monitored by base system 20, such as protected airspace 8. In other exemplary embodiments, base system 20 may be any of various other systems, military or otherwise, that track the positions of aircraft, either for purposes of guarding a tactical airspace or for any of various other reasons. In the illustrated embodiment, base system 20 may be guarding protected airspace 8 and may be tasked to determine the status, i.e. friendly, neutral or hostile, of any aircraft approaching protected airspace 8 and also to fire upon any unauthorized aircraft that enters into protected airspace 8. Base system 20 may include means such as a sub-system for determining if an aircraft is friendly, neutral or hostile. Various methods and techniques are known for determining if an aircraft is a neutral, friendly or hostile aircraft. If the aircraft is, indeed an enemy or hostile aircraft, base system 20 may engage the hostile aircraft such as by firing upon it. If the aircraft is determined to be a neutral aircraft approaching protected airspace 8, base system 20 will attempt to alert neutral aircraft 10 to avoid protected airspace 8. Similarly, if the aircraft's status has not been determined, base system 20 may similarly attempt to alert the aircraft. Although the invention may equally find application for aircraft of undetermined status and aircraft determined to be neutral aircraft, the aircraft of interest will hereinafter be referred to as neutral aircraft 10.

Neutral aircraft 10 may be using any of various TCAS systems to search for other aircraft that may pose a threat of collision, by monitoring the airspace around it for other aircraft equipped with corresponding TCAS systems and active transponders. Neutral aircraft 10 may advantageously make TCAS SSR interrogations at regular intervals. The TCAS system of neutral aircraft 10 may advantageously use Mode S transmissions, though it may alternatively use Mode C transmissions. Generally speaking, neutral aircraft 10 sends out interrogation signals 14 using a 360° scan to look for other aircraft such as second aircraft 6 which may pose a threat due to its location and speed and direction of travel. The interrogator or other portion of TCAS system of neutral aircraft 10 is capable of receiving and interpreting SSR signals sent responsive to interrogation signals 14.

Generally speaking, aircraft with older TCAS systems may use Mode C transmissions and aircraft with newer TCAS systems may use Mode S transmissions. Neutral aircraft 10 may advantageously use both forms of transmission, i.e. Mode C and Mode S, in order to broaden its search to include any aircraft because other aircraft that may pose a threat to the interrogating neutral aircraft 10 may themselves have older Mode C or newer Mode S transponders and systems. Neutral aircraft 10 generates interrogating signals 14 with the confidence that the overwhelming majority of other commercial aircraft such as second aircraft 6 will include a transponder onboard capable of detecting either the Mode C or Mode S transmissions generated by neutral aircraft 10 via interrogation signals 14, and generating a responsive signal that the TCAS system of neutral aircraft 10 is capable of receiving. The interrogating and responsive signals may advantageously provide relevant information such as position, flight path, speed, altitude and the like, such that aircraft are made aware of one another and a midair collision can be safely avoided.

In addition to neutral aircraft 10 regularly sending out Mode S or Mode C interrogation signals 14 particularly directed to soliciting a response from a potential threat aircraft, neutral aircraft 10 may additionally generate and send out Mode S squitter transmissions 16 to broadcast its position to other aircraft and neutral aircraft 10 may additionally search for Mode S squitter transmissions sent out by other aircraft that may potentially pose a threat to the airspace of neutral aircraft 10. If another aircraft is detected as a potential threat, neutral aircraft 10 may send out warning signals using conventional means.

The invention, as described herein, is directed to influencing an aircraft, if its status cannot be determined or after the aircraft has been determined to be a neutral aircraft, not to enter a guarded airspace such as protected airspace 8 so as to avoid engagement by base system 20 or by another engagement system, upon entering protected airspace 8. Depending on the level of military aggression desired, however, the invention may also be used to notify hostile aircraft not to approach or enter a guarded tactical airspace as the invention finds application and is effective with any aircraft equipped with the various, e.g. Mode C or Mode S, TCAS systems.

According to the invention, base system 20 is provided for detecting and responding to interrogation signals 14. Base system 20 includes a detector capable of detecting both Mode C interrogation signals and Mode S interrogation signals such as may be sent out by aircraft. According to one aspect, base system 20 includes a detector that searches for signals that have been sent out by an interrogating aircraft and detects such interrogation signals and a transponder for responding to such signals. Base system 20 may advantageously include a computer or other processor that may execute instructions such as may be provided by a computer readable medium and the transponder of base system 20 may respond to the detected signals in accordance with the executable instructions. Various conventional and suitable transponders and computers are available and may be used in base system 20.

According to another exemplary embodiment, base system 20 may additionally send out its own SSR Mode S squitter transmissions 24 looking for an aircraft and the Mode S squitter transmissions 24 may use a particular address, commonly a unique 24-bit identifier. Base system 20 may then monitor the airspace for responsive signals that use the same address.

As such, according to one exemplary embodiment, base system 20 may send out squitter transmissions 24 soliciting a response from an aircraft and then search for responses to the squitter transmissions, particularly at the same address used in the outgoing squitter transmission, and, in another exemplary embodiment, base system 20 simply monitors the airspace to detect Mode S or Mode C interrogation signals 14 sent out by an aircraft.

According to either exemplary embodiment, once a received interrogation signal 14R is received by base system 20, a transponder of base system 20 sends a response signal 26 to neutral aircraft 10. Generally speaking, base system 20 spoofs any neutral aircraft potentially approaching protected airspace 8 to alert such aircraft by suggesting that base system 20 is another aircraft, in particular, an aircraft that may pose a threat for midair collision, using the neutral aircraft's TCAS system. Base system 20 sends out response signals 26 to an identified aircraft approaching protected airspace 8 that suggests that base system 20 is an aircraft at the same altitude and approaching the identified aircraft. Response signals 26 may advantageously be sent predictively, as will be described. The response signals 26 sent out using SSR technology in a mode compatible with the interrogating aircraft's TCAS system, are received by interrogating neutral aircraft 10 and may advantageously be visually displayed on an instrument panel such as the interrogating aircraft's cockpit TCAS display. The aircraft so alerted will then avoid traveling into protected airspace 8 as it believes to have been alerted that doing so may result in a collision with another aircraft.

TCAS systems such as may be employed on neutral aircraft 10, detect response signals 26 and measure range to a threat aircraft using the time difference $T_D$ between the transmission of an interrogation signal, e.g. interrogating signal 14, and the receipt of a corresponding response signal believed to have been sent by a transponder on the threat aircraft or other vehicle. This time difference $T_D$ may be used by the TCAS system to determine the range (or "distance") to the responding transponder as follows. The SSR signals travel at the speed of light, and the transponder is allocated a nominal latency time $T_{L\text{-}NOM}$ in which to respond to interrogations. After measuring time difference $T_D$ between the time interrogation signal 14 was transmitted and the time a response to the interrogation signal was received from the transponder, e.g. the time response signal 26 is received, the TCAS system subtracts the nominal SSR latency time $T_{L\text{-}NOM}$ from the time difference $T_D$ to obtain the two-way transit time $T_T$ that it took for the SSR signals to travel from the TCAS system to the transponder, then back again. Since these SSR signals are electro-magnetic radio waves that travel at the speed of light, by multiplying the transit time $T_T$ by the speed of light and dividing this result by two to account for travel time both to and from the transponder, the TCAS system determines its distance from, i.e. range to, the transponder, the accuracy of which is subject to the deviation between the transponder's actual latency time $T_{L\text{-}ACT}$ that it took to respond to the interrogation, and the nominal latency time $T_{L\text{-}NOM}$ specified for use in the SSR system.

According to the invention, a transponder on base system 20 sends out response signals 26 such that this time difference $T_D$, i.e. the time between a first time that an aircraft sends out interrogation signal 14 and a second time that the aircraft receives a corresponding response signal 26, decreases in time. This is interpreted by the TCAS system of neutral aircraft of the approach of another aircraft or vehicle due to the apparent reduction in range between neutral aircraft 10 and the transponder responding to its interrogations. Response signals 26 may also advantageously carry with them an altitude indicator that contains values generated by base system 20 that suggest that the sender is at or near the same altitude as neutral aircraft 10. With the time difference $T_D$ steadily decreasing over time, neutral aircraft 10 infers that another aircraft at substantially the same altitude is approaching because the time difference $T_D$ associated with the response signals 26, is decreasing suggesting that the responding transponder is getting closer.

According to one exemplary embodiment, when neutral aircraft 10 is sufficiently far away from base system 20, base system 20 responds to each of received interrogation signals 14R of neutral aircraft 10, with a corresponding response signal 26. Base system 20 spoofs neutral aircraft 10 by responding more quickly than a stationary base system would normally respond. Base system 20 utilizes the convention that TCAS interrogation signals typically occur at regular intervals. In one exemplary embodiment, the intervals may start at a rate of about once every five seconds and increase to a frequency of about once a second when the interrogating aircraft determines that an alert situation may be taking place. The time intervals, i.e. frequency, will typically change as a step function, e.g. from once every 5 seconds to once every second in one embodiment, and various TCAS systems typically have various associated step function frequency changes that are known to be triggered at associated ranges.

Base system 20 may initially respond to received interrogation signals 14R with response signals 26 at the rate at which it receives the interrogation signals 14R and then increase its rate of response according to one exemplary embodiment. Then, over time, base system 20 may begin to anticipate the reception of the interrogation signals 14R and will predictively send its response signals 26 before having received the corresponding interrogation signal 14R. Response signals 26 may be sent at a progressively higher rate than the rate at which base system 20 actually receives the interrogation signals 14R. This has the effect of progressively reducing the time difference $T_D$, which neutral aircraft 10 believes to be the response to its interrogation as conventionally generated by a transponder in response to an interrogation received by the transponder. This has the effect that the TCAS system of neutral aircraft 10 calculates a progressively shorter distance between neutral aircraft 10 and the apparent object responding to its interrogations.

When the base system 20 transponder begins to respond to the interrogations in a predictive manner, it may calculate its response rate in the following manner, according to one exemplary embodiment. Because base system 20 will receive an interrogation at time $T_R$ based on the recent history of the average interrogation rate $R_I$ of neutral aircraft 10, e.g. once every x seconds, base system 20 may advantageously predictively generate a response at time $T_R$ minus simulated time $T_S$ so that the time difference $T_D$ measured by neutral aircraft 10 indicates an apparent range to the transponder of base system 20, that is less than the true range to the transponder. Since interrogation signals 14R are issued at a fixed rate $R_I$, the transponder of base system 20 may initially generate response signals 26 at a rate $R_R$ that is initially equal to interrogation rate $R_I$ of neutral aircraft 10. Rate $R_R$ of response signals 26 may then grow progressively greater than $R_I$ thereby decreasing $T_D$ and simulating an approach to neutral aircraft 10 by an aircraft whose range to neutral aircraft 10 is progressively shrinking and thereby appears to be on a collision course with neutral aircraft 10.

Once the frequency $R_I$, is determined, the transponder of base system 20 may predictively respond to received interrogation signals 14R before they are detected. In one embodiment, for at least some of received interrogation signals 14R, the transponder of base system 20 may predictively respond by sending corresponding response signals 26 about 0.05 to 0.1 seconds before received interrogation signals 14R are actually received. For example, for an interrogation signal frequency of once every 5 seconds, one or more corresponding response signals 26 may be initially sent 4.95 seconds after the corresponding interrogation signal 14R is sent. According to this exemplary embodiment, response signals 26 are afterwards sent at incrementally earlier times after interrogation signals 14R are sent. In one exemplary embodiment, the time difference $T_D$ may decrease incrementally by about 0.05 seconds or by 0.1 seconds, i.e. response signals 26 may initially be sent 4.95 seconds after the corresponding received interrogation signal 14R is sent, then afterwards sent 4.90 seconds after the corresponding received interrogation signal 14R is sent, then afterwards sent 4.85 seconds after the corresponding received interrogation signal 14R is sent, etc., etc.

Neutral aircraft 10 may respond to the apparently approaching aircraft as simulated by the progressively higher rate of response signals 26 generated by base system 20, by maneuvering to avoid the apparent threat aircraft and thereby also maneuvering to avoid approaching guarded airspace 8. Until neutral aircraft 10 takes such action, however, base system 20 will continue to increase the rate $R_R$ at which it generates response signals 26 so as to continue to simulate the closing approach to neutral aircraft 10 of another aircraft on a collision course with neutral aircraft 10.

As the transponder of base system 20 monitors interrogation signals 14R from neutral aircraft 10 and respond thereto, base system 20 also monitors the frequency $R_I$ at which interrogation signals 14R are sent and detects when the frequency changes, typically an increase in frequency by step function. The change in frequency may include the TCAS system in neutral aircraft 10 switching to a higher interrogation rate of one interrogation per second, such as may be done in critical situations in various TCAS systems, when TCAS of neutral aircraft 10 believe a collision is imminent. Base system 20 can anticipate the time at which the TCAS system of neutral aircraft 10 will switch from the original rate to a higher rate based on familiarity with the TCAS system and associated triggers that cause the TCAS system to change frequency. In one embodiment, the TCAS system of neutral aircraft 10 will switch frequency of signal generation at a predetermined range, i.e., a critical distance from the approaching vehicle and base system 20 can determine the range calculated by neutral aircraft 10 based on $T_D$, as received by neutral aircraft 10. Alternatively, base system 20 can wait until it begins receiving received interrogation signals 14R at the higher rate, thereby possibly missing the opportunity to predictively generate responses to one or more received interrogation signals 14R, depending on the actual distance between neutral aircraft 10 and base system 20 at the time the interrogation rate changes.

Each of the aforementioned exemplary embodiments hold true for both Mode C and Mode S interrogation signals 14 sent by neutral aircraft 10. According to either exemplary embodiment, response signals 26 are sent using conventional SSR communications and advantageously using the same operating mode as the received signal. Such communications are received by the corresponding Mode C or Mode S TCAS system of neutral aircraft 10 and a visible alert is displayed on the cockpit TCAS display of neutral aircraft 10.

The frequency of generation of TCAS interrogations at regular intervals may start at a rate ranging from about once every second to about once every ten seconds and may have the frequency increased if an alert is suspected. An aspect of the invention is that the transponder on base system 20 sends out response signals 26 to produce the previously described time difference $T_D$ that decreases in time, even when the interrogating signals sent out by neutral aircraft 10 are generated at an increased frequency.

In various exemplary embodiments, base system 20 may additionally send out radio signals 4 (see FIG. 1) to alert the aircrew of neutral aircraft 10 as a secondary warning in conjunction with the SSR signals described supra.

After neutral aircraft 10 has been communicated with by base system 20 and spoofed into believing that another threat aircraft at substantially the same altitude poses a threat of midair collision, neutral aircraft 10 may advantageously change its course and avoid continuing into protected airspace 8. In this manner, an engagement by base system 20 with a neutral aircraft 10, is avoided.

Base system 20 may include a detector capable of detecting SSR interrogation signals including Mode S and Mode C signals, a computer or other processor and also a transponder. The transponder is capable of responding to the interrogation signals by generating corresponding response signals as described supra. Base system 20 may additionally include weapons capable of firing at an aircraft and if the aircraft is identified as hostile aircraft or if it continues into protected airspace 8, base system 20 may fire upon the aircraft.

A computer readable medium with executable instructions may be included in a computer of base system 20 and the transponder of base system 20 may send response signals with a decreasing time difference $T_D$, as described supra in accordance with instructions executed by a computer communicating with the transponder. Various conventional transponders may be used.

Figure 3:
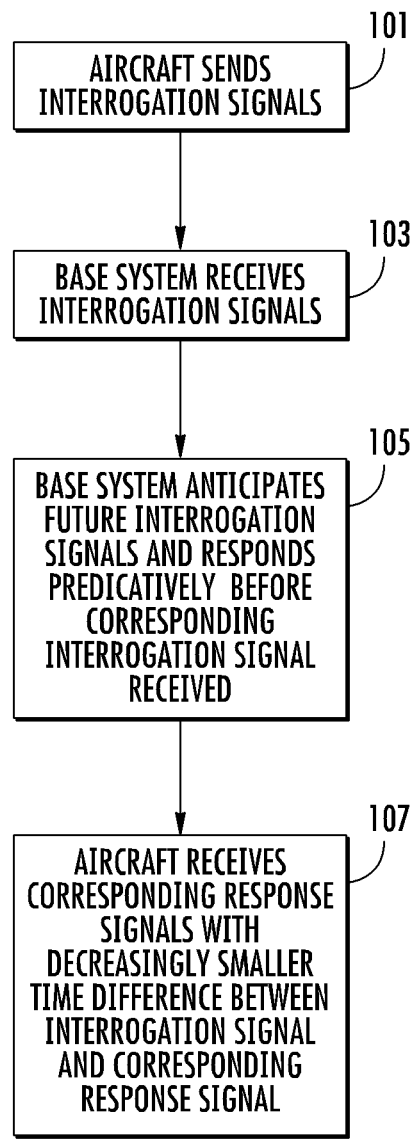
FIG. 3 is a flowchart illustrating an exemplary method of the invention.

FIG. 3 is a flowchart illustrating an exemplary method of the invention as described herein. At step 101, an aircraft such as neutral aircraft 10 sends interrogation signals 14. At step 103, a base system receives interrogation signals such as interrogation signals 14R which may be Mode C interrogation signals or Mode S interrogation signals. The base system also detects the frequency of the interrogation signals. At step 105, the base system anticipates future interrogation signals and includes a transponder that responds predicatively with response signals such as response signals 26 before the corresponding interrogation signal 14R is received, as described supra. At step 107 neutral aircraft 10 receives corresponding response signals 26 with a decreasingly smaller time difference between the time that an interrogation signal 14R was sent, and the time that a corresponding response signal 26 was received.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A system for preventing engagement with a neutral aircraft, comprising:
    a detector that detects SSR (Secondary Surveillance Radar) interrogation signals generated by an aircraft, including detecting frequency of generation of said interrogation signals; and
    a transponder that responds to said interrogation signals by generating corresponding response signals such that a time difference between a first time that said aircraft sends out said interrogation signal and receives said corresponding response signal, and a subsequent time that said aircraft sends out said interrogation signal and receives said corresponding response signal, decreases in time.

2. The system as in claim 1, wherein said detector further detects an altitude of said aircraft and said response signals include an indication that a sender is situated at or near said altitude.

3. The system as in claim 1, further comprising a signal generator that generates squitter transmissions to locate aircraft.

4. The system as in claim 3, wherein said signal generator generates Mode S squitter transmissions using a particular address and said detector searches for Mode S interrogation signals generated using said address.

5. The system as in claim 1, wherein said frequency of generation of said interrogation signals includes an initial value of about one every 5 seconds.

6. The system as in claim 1, wherein said time difference decreases in time by increments of about 0.05 seconds.

7. The system as in claim 1, further comprising a computer readable medium with executable instructions that cause said transponder to generate said corresponding response signals with said time difference that decreases in time.

8. The system as in claim 1, wherein said transponder is disposed on a warship that further comprises weapons capable of firing at said aircraft.

9. The system as in claim 1, wherein said corresponding response signals are sent predictively and are initially sent about 0.05 to 0.1 seconds before said interrogation signals are received.

10. The system as in claim 1, wherein said interrogation signals and said response signals each comprise Mode S SSR signals, and said interrogation signals are generated by a TCAS (Traffic Alert and Collision Avoidance System) system of said aircraft.

11. The system as in claim 1, wherein said interrogation signals comprise Mode C SSR signals, and said interrogation signals are generated by a TCAS (Traffic Alert and Collision Avoidance System) system of said aircraft.

12. The system as in claim 1, wherein said corresponding response signals generated by said transponder are visually displayed on an instrument panel in a cockpit of said aircraft.

13. The system as in claim 1, wherein said system further comprises weapons capable of firing at said aircraft and a sub-system for determining if said aircraft is a neutral aircraft.

14. The system as in claim 1, wherein said corresponding response signals are sent predictively before said interrogation signals are received.

15. The system as in claim 1, wherein said time difference is decreased in order to mimic a reduction in distance between the position of said aircraft and the position of said transponder.

16. A method for preventing engagement with a neutral aircraft, said method comprising:
    detecting SSR (Secondary Surveillance Radar) interrogation signals generated by an aircraft, including detecting a frequency of generation of said interrogation signals; and
    responding to said interrogation signals by generating corresponding response signals such that a time difference between a first time that said aircraft generates one said interrogation signal and receives said corresponding response signal, and a subsequent time that said aircraft sends out said interrogation signal and receives said corresponding response signal, decreases in time.

17. The method as in claim 16, further comprising, prior to said detecting, generating squitter transmission signals to locate said aircraft.

18. The method as in claim 17, wherein said generating squitter transmissions comprises generating Mode S squitter transmissions.

19. The method as in claim 17, wherein said squitter transmission signals use a designated address and said detecting SSR interrogation signals comprises monitoring airspace for Mode S interrogation signals that use said designated address.

20. The method as in claim 16, further comprising detecting an altitude of said aircraft and wherein said responding comprises said response signals indicating that a sender is situated at or near said altitude.

21. The method as in claim 16, wherein said frequency of generation of said interrogation signals decreases in time.

22. The method as in claim 16, wherein said interrogation signals comprise one of Mode S interrogation signals and Mode C interrogation signals.

23. The method as in claim 16, further comprising determining if said aircraft is a neutral aircraft.

24. The method as in claim 16, wherein said generating corresponding response signals comprises providing a visible alert in a display of an instrument panel of said aircraft.

25. The method as in claim 16, wherein said responding comprises predictively responding to said interrogation signals before said interrogation signals are detected, for at least some of said interrogation signals.

26. The method as in claim 16, wherein said detecting a frequency comprises detecting a frequency of once every 5 seconds and said responding comprises initially responding 4.95 seconds after one of said corresponding interrogation signals is sent, then responding at incrementally earlier times after said interrogation signals are sent.

27. The method as in claim 16, wherein said time difference is decreased in order to mimic a reduction in distance between the position of said aircraft and the position of said transponder.

* * * * *